3,206,355
MICA GLASS METAL BONDED ASSEMBLY AND METHOD OF MAKING THE SAME
Lawrence V. Pfaender, Toledo, Ohio, assignor to Owens-Illinois, Inc., a corporation of Ohio
No Drawing. Filed Mar. 11, 1960, Ser. No. 14,170
10 Claims. (Cl. 161—196)

This invention relates to mica and metal bonds and to methods of effecting the same. More specifically this invention relates to the bonding of (a) mica or (b) materials containing a preponderance of mica to a selected group of metals.

A problem confronting the art is the preparation of a satisfactory seal between mica and metals. Ordinary solder glasses have been found to be inadequate for the purpose of bringing about a bonding together of these comparatively diverse materials, namely, one crystalline and the other metallic. Accordingly it is apparent that a method of bonding which would insure a good seal between mica and metals would find wide industrial application where the properties of mica with respect to high electrical resistance and stability to high temperatures are desired.

It is, therefore, an object of this invention to provide an effective mica to metal seal. A further object of this invention is to provide a firm seal between a metal and an inorganic high temperature stable crystalline material containing a large proportion of mica. A further object of this invention is to provide methods for making the aforementioned seals between metals and crystalline materials consisting of mica or mica containing materials. These and other objects will be apparent from the description which follows.

The novelty of the present invention is the discovery that a metal can be sealed to mica by means of a devitrifiable solder glass. Methods for preparing the improved mica-devitrified glass-metal bonded assembly will be more completely understood by reference to the following examples. In each instance all parts and percentages are by weight unless otherwise specified.

*Example I*

A #446 stainless steel screw was sealed to a block of powdered mica bonded into a uniform mass under high temperature and pressure by means of a lead borate glass matrix and sold under the trademark "Mycalex" by first forming an opening in the block and thereafter inserting the steel screw therein and a sufficient amount of a suspension of powdered devitrifiable solder glass. This suspension, which is approximately the consistency of putty, consists of the powdered devitrifiable glass in nitrocellulose dissolved in amylacetate. The entire mica-glass-steel assembly is then heated in an oven to approximately 900° F. to fuse the glass and thereafter cooled slowly so as to effect devitrification of the glass. Upon complete cooling to room temperature the bond is observed to be dimensionally stable and of excellent strength.

*Example II*

The procedure of Example I was repeated with the same excellent results except that the devitrifiable glass is introduced as a powder to the opening in a mica block and the heat is applied by means of a gas-oxygen torch, the whole process being comparable to the conventional feeding of a silver solder as employed in the usual metal soldering techniques.

*Example III*

The procedure of Example I was repeated except a #430 stainless steel screw was employed and a strong bond was formed which is resistant to high temperatures.

*Example IV*

The procedure of Example II was repeated except a mica block and a pin consisting of an alloy of platinum and palladium (50%–50%) were employed to form a bonded article.

The compositions of the stainless steels referred to above are as follows:

|  | 446 | 430 |
|---|---|---|
| Fe | 69–73% | 79–83%. |
| Cr | 23–27% | 14–18%. |
| Ti |  | 0.36%. |
| Ni | 1.0% | 0.5%. |
| Si | 1.0% | 1.0%. |
| Mn | 1.5% | 1.0%. |
| C | .3% | 0.14%. |
| N$_2$ | .2% |  |
| Expansion Coefficient (from 0–300° C.). | 103 × 10$^{-7}$ inch/inch/° C. | 108 × 10$^{-7}$ inch/inch/° C. |

*Example V*

The procedure of Example I was repeated except that a block of Mycalex was bonded to a plate of #446 stainless steel and an excellent seal obtained.

*Example VI*

The procedure of Example I was repeated except that a wire of #430 stainless steel was bonded to a block of mica and an excellent seal obtained.

The above examples are merely by way of illustration and are not intended to limit the scope of the present invention. In fact this invention is applicable to the bonding of any metal or alloy to mica by means of a devitrifiable glass provided the metal or alloy has an expansion coefficient approximating that of natural mica or glass bonded mica such as Mycalex, namely, 100×10$^{-7}$ inch/inch/° C. Also it will be found desirable to prepare preliminarily the metal or alloy by degreasing, sand blasting, and oxidizing if the best seal results are to be obtained.

It is to be understood that other organic binders may be employed provided they will burn off and volatilize during the heating of the heating of the mica-devitrifiable glass-metal assembly either in an oven or by a gas-oxygen torch as described above. In addition the organic binder should not react with any of the elements making up the bonded assembly consisting of mica, glass, and metal. Accordingly other organic binders which can be used include gelatine dissolved in water, nitrocellulose and butyl acetate, camphor with cellulose nitrate, and the like.

A devitrifiable solder glass which has been found suitable for use in the present invention has the following composition. This is the glass employed in Example I.

| Compound: | Percent |
|---|---|
| SiO$_2$ | 2.00 |
| ZnO | 12.83 |
| PbO | 76.22 |
| B$_2$O$_3$ | 8.95 |

The above formulation is merely illustrative and it is apparent that other devitrifiable solder glasses having expansion coefficients comparable to the mica or mica bonded glass (Mycalex) can be used. By way of further example, devitrifiable solder glasses of the following composition ranges can be satisfactorily employed in the present invention.

| Component: | Percent |
|---|---|
| SiO$_2$ | 1–3 |
| ZnO | 7–14 |
| BaO | 0–8 |
| PbO | 70–80 |
| B$_2$O$_3$ | 7–10 |

The heating of the assembly consisting of the mica, metal, and devitrifiable glass whether the latter is in an emulsion or powdered form is usually carried out at a temperature of about 900° F. for around 30 to 60 minutes.

From the foregoing description it will be evident that there has been devised a novel bonded assembly for sealing mica and related materials to selected metals and alloys whose expansion coefficients approximate each other.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

What I claim is:

1. An integrally bonded assembly consisting of (1) a crystalline material selected from the group consisting of mica and glass bonded mica; (2) a metal alloy selected from the group consisting of (a) 446 stainless steel, (b) 430 stainless steel, and (c) an alloy of platinum and palladium of 1:1 ratio each having a thermal expansion comparable to the crystalline material; and (3) a devitrified glass.

2. An integrally bonded assembly consisting of (1) a crystalline material of glass bonded mica; (2) 446 stainless steel; and (3) a devitrified glass.

3. An integrally bonded assembly consisting of (1) a crystalline material of glass bonded mica; (2) 430 stainless steel; and (3) a devitrified glass.

4. An integrally bonded assembly consisting of (1) a crystalline material of mica; (2) an alloy of platinum and palladium of 1:1 ratio; and (3) a devitrified glass.

5. An integrally bonded assembly comprising mica, 446 stainless steel, and a devitrified glass.

6. An integrally bonded assembly comprising mica, 430 stainless steel, and a devitrified glass.

7. A method of making a bond between (1) a crystalline material selected from the group consisting of mica and glass bonded mica containing a preponderance of mica and (2) a metallic material selected from the group consisting of metals and alloys having a thermal expansion comparable to the crystalline material comprising bringing the crystalline and metallic material in sealing relation contacting the crystalline and metallic materials with powdered devitrifiable glass, fusing the glass, and thereafter slowly cooling the glass to effect a devitrification of the glass and a bonding together of the crystalline and metallic materials by means of the devitrified glass.

8. The method of claim 7 in which the devitrifiable glass is in the form of a suspension.

9. A method of making a bond between (1) a crystalline material selected from the group consisting of mica and glass bonded mica containing a preponderance of mica and (2) a metallic material selected from the group consisting of metals and alloys having a thermal expansion comparable to the crystalline material comprising bringing the crystalline and metallic material in sealing relation contacting the crystalline and metallic materials with powdered devitrifiable glass having the following range in composition:

| Component— | Percent |
|---|---|
| $SiO_2$ | 1–3 |
| $ZnO$ | 7–14 |
| $BaO$ | 0–8 |
| $PbO$ | 70–80 |
| $B_2O_3$ | 7–10 | fusing the glass, and thereafter slowly cooling the glass to effect a devitrification of the glass and a bonding together of the crystalline and metallic materials by means of the devitrified glass.

10. A method of making a bond between (1) a crystalline material selected from the group consisting of mica and glass bonded mica containing a preponderance of mica and (2) a metal alloy selected from the group consisting of (a) 446 stainless steel, (b) 430 stainless steel, and (c) an alloy of platinum and palladium each having a thermal expansion comparable to the crystalline material comprising bringing the crystalline and metallic material in sealing relation contacting the crystalline and metallic materials with powdered devitrifiable glass having the following range in composition:

| Component— | Percent |
|---|---|
| $SiO_2$ | 1–3 |
| $ZnO$ | 7–14 |
| $BaO$ | 0–8 |
| $PbO$ | 70–80 |
| $B_2O_3$ | 7–10 | fusing the glass, and thereafter slowly cooling the glass to effect a devitrification of the glass and a bonding together of the crystalline and metallic materials by means of the devitrified glass.

References Cited by the Examiner

UNITED STATES PATENTS

| 38,286 | 4/63 | Cobley et al. | 106—52 X |
| 1,814,012 | 7/31 | Taft | 65—33 |
| 2,032,239 | 2/36 | Wedlock | 106—48 |
| 2,113,818 | 4/38 | Sullivan | 65—33 X |
| 2,274,999 | 3/42 | Allen | 65—59 X |
| 2,394,919 | 2/46 | Kingston | 65—59 X |
| 2,424,955 | 10/47 | Goldsmith | 65—59 X |
| 2,663,658 | 12/53 | Schurecht | 65—33 X |
| 2,687,364 | 8/54 | Buerger et al. | 156—425 |
| 2,771,969 | 11/56 | Brownlow | 65—18 X |
| 2,794,059 | 5/57 | Smith | 65—43 X |
| 2,876,120 | 3/59 | Machlan | 65—33 X |
| 2,889,952 | 6/59 | Claypoole | 65—43 X |
| 2,903,826 | 9/59 | Monack | 65—22 |

FOREIGN PATENTS

| 625,466 | 6/49 | Great Britain. |
| 634,548 | 3/50 | Great Britain. |

OTHER REFERENCES

"Phase Diagrams for Ceramists," by Levin, McMurdie and Hall, published by The American Ceramic Society, Columbus, Ohio, 1956, pages 14 to 34.

"Handbook of Glass Manufacture," vol II, by Fay V. Tooley, published by Ogden Publishing Co., 55 West 22nd St., New York, 36, N.Y., pages 187 to 199.

DONALL H. SYLVESTER, *Primary Examiner.*

IVAN R. LADY, ARTHUR P. KENT, MORRIS O. WOLK, *Examiners.*